United States Patent
Classon et al.

(10) Patent No.: US 7,570,951 B2
(45) Date of Patent: Aug. 4, 2009

(54) NEIGHBOR-ASSISTED HANDOVER IN MOBILE COMMUNICATIONS SYSTEMS

(75) Inventors: Brian K. Classon, Palatine, IL (US); Michael D. Kotzin, Buffalo Grove, IL (US); Ravi Kuchibhotla, Gurnee, IL (US); Kevin L. Baum, Rolling Meadows, IL (US); Vijay Nangia, Algonquin, IL (US); Philippe J. Sartori, Algonquin, IL (US)

(73) Assignee: Motorola, Inc., Schaumburg, IL (US)

( * ) Notice: Subject to any disclaimer, the term of this patent is extended or adjusted under 35 U.S.C. 154(b) by 506 days.

(21) Appl. No.: 11/348,208

(22) Filed: Feb. 6, 2006

(65) Prior Publication Data
US 2007/0183374 A1 Aug. 9, 2007

(51) Int. Cl.
*H04Q 7/20* (2006.01)

(52) U.S. Cl. .................. 455/437; 455/550.1; 455/11.1; 379/315; 379/331

(58) Field of Classification Search ................. 370/331, 370/328, 338, 315; 455/437, 436, 550.1, 455/11.1
See application file for complete search history.

(56) References Cited

U.S. PATENT DOCUMENTS

| | | | |
|---|---|---|---|
| 6,173,181 B1 * | 1/2001 | Losh | 455/434 |
| 6,532,369 B1 * | 3/2003 | Myer | 455/517 |
| 6,564,058 B1 | 5/2003 | Flewitt et al. | |
| 6,819,923 B1 | 11/2004 | Friman | |
| 6,895,246 B2 | 5/2005 | Bonta | |
| 2004/0121766 A1 | 6/2004 | Benson et al. | |
| 2004/0148297 A1 | 7/2004 | Park et al. | |
| 2004/0266340 A1 * | 12/2004 | Ivanov et al. | 455/11.1 |
| 2006/0073834 A1 * | 4/2006 | Thorson | 455/450 |

* cited by examiner

*Primary Examiner*—Danh C Le

(57) ABSTRACT

A method is provided that comprises detecting, by a first user terminal of a wireless system, a second user terminal having wireless system information. The wireless system information has timely wireless system parameters. The timely wireless system parameters are collected from the second user terminal. The first user terminal communicates with a base station based on the wireless system parameters.

20 Claims, 4 Drawing Sheets

NEIGHBOR-ASSISTED HANDOVER IN MOBILE COMMUNICATIONS SYSTEMS

TECHNICAL FIELD

This invention relates generally to wireless communication systems and more particularly to handover techniques.

BACKGROUND

Cellular systems utilize a plurality of base stations to connect user terminals, such as cellular telephones, to the cellular system. Each of the user terminals initially communicates with a base station to exchange information with the system. The user terminals often must be subsequently handed over, however, to other base stations when the user terminals physically move or the current base station experiences congestion while servicing other user terminals.

In advanced cellular systems, several aspects of the communication link between a base station and a user terminal vary with the location of the user terminal. Examples of parameters that are location-dependent include modulation level and coding rate, transmit power, and timing advance for uplink transmissions.

Normally, the parameters that are appropriate for a particular user terminal must be determined by a process that includes probing the channel conditions, reporting the results, and facilitating a signaling/negotiation of the values between the base station and the user terminal. Unfortunately this process typically uses some of the channel capacity that could otherwise be used for carrying data traffic. In addition, in a packet data system, terminals typically use the system in a bursty fashion rather than continuously. As a result, user terminals may move or go into a power-saving mode between transmissions and may need to re-establish the appropriate link parameters on a frequent basis, which further reduces the data capacity and/or increases the latency of the system.

Furthermore, the performance of handoffs of a user terminal from one base station to another is typically dependent on a so-called neighbor list of potential servicing base stations that have been measured. An inaccurate neighbor list can degrade service quality (including bit rate, latency, or voice quality) or lead to a dropped call. If the size of the neighbor list may vary, a larger neighbor list can increase the volume of measurements required in order to make a handoff, leading to an increased latency and/or decreased battery life for the user terminals. Also, a neighbor list typically offers inadequate and outdated information upon startup or upon emergence from a power savings (e.g., sleep) mode, a frequent occurrence in a packet data system.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments of the present invention. Also, common and well-understood elements that are useful or necessary in a commercially feasible embodiment are often not depicted in order to facilitate a less obstructed view of these various embodiments of the present invention.

DETAILED DESCRIPTION

Generally speaking, pursuant to these various embodiments, a method and system for exchanging cellular system information directly from one user terminal, such as a cellular phone, to another user terminal is provided. The information is exchanged directly from a first user terminal to a second user terminal so that the second user terminal can determine various channel operating conditions, parameters, and a list of neighboring base stations without having to utilize the bandwidth on the channel for communicating with a base station to determine this information. Instead, the user terminals may each include a transceiver to communicate with the other nearby user terminals via, e.g., Bluetooth or a Wireless Local Area Network ("WLAN").

By acquiring the information directly from nearby user terminals, accurate and timely cellular system information regarding, e.g., operating conditions, parameters, and lists of neighboring base stations for handing over calls is obtained. Moreover, the burden on cellular system resources for adapting the terminal parameters is substantially reduced.

Figure 1:
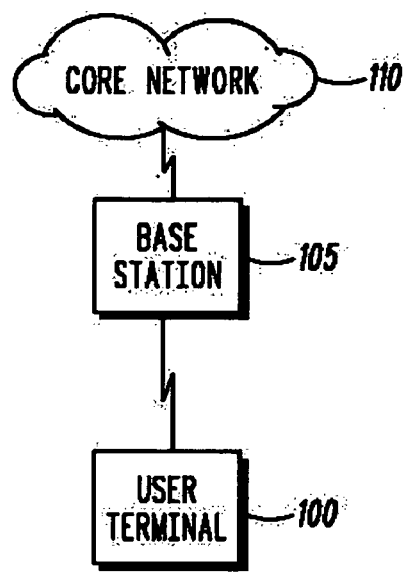
FIG. 1 illustrates a user terminal in communication with a base station according to an embodiment of the invention.

FIG. 1 illustrates a user terminal 100 in communication with a base station 105 according to an embodiment of the invention. As discussed above, the user terminal 100 may comprise, e.g., a cellular telephone. The user terminal 100 is in communication with the base station 105 when, e.g., a call is made via the user terminal 100. When the call is made, data is transmitted between the user terminal 100 and the base station 105. The data may include information from a variety of services, such as data file transfers, voice service, video service, gaming, etc. The base station 105 is also in communication with a core network 110. The core network 110 may comprise, e.g., 3rd generation (3G) network elements, 4th generation (4G) elements, 802.20 elements, or other current networks utilizing next-generation handsets with short-range capabilities such as Bluetooth or wireless local area network (WLAN, e.g. IEEE 802.11). The data is transmitted from the base station 105 through the core network 110 and on to their final destination which may be, e.g., another base station in communication with another user terminal or a fixed terminal.

The user terminal 100 may be in communication with the base station 105 when physically located within the base station's 105 cell, i.e., its service area. However, there is often a plurality of base stations in the same geographical area having overlapping cell coverage. Accordingly, a call made with the user terminal 100 may often be handled by either the base station 105 or another base station within the same geographical area. Each base station has a limited amount of wireless bandwidth for communicating with the user terminals. Accordingly, the base station 105 can only service so many calls at a time before hitting the wireless bandwidth limit and adversely affecting the servicing of existing calls. When the user terminal moves near the edge of a cell, the call is handed off to another base station 105 that is more capable of servicing the call. To determine a base station 105 to which to hand off a call, the user terminal 100 may utilize a "neighbor list," i.e., a list of neighboring base stations capable of servicing the call.

Figure 2:
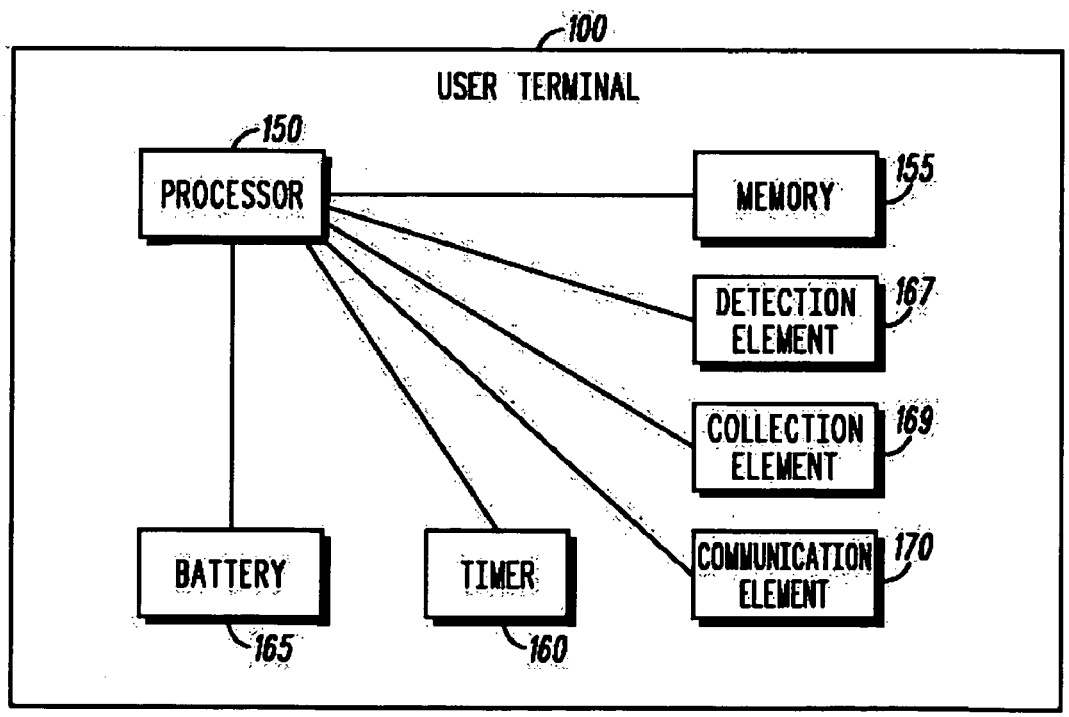
FIG. 2 illustrates a block diagram of the user terminal according to an embodiment of the invention.

FIG. 2 illustrates a block diagram of the user terminal 100 according to an embodiment of the invention. As illustrated, the user terminal 100 includes a processor 150, a memory 155, a timer 160, a battery 165, a detection element 167, a collection element 169, and a communication element 170. The communication element comprises one or more transceivers having a transmitter element and a receiver element and provides user terminal 100 with a capability to wirelessly communicate with base station 105 and with other user terminals. The processor 150 may be in communication with the memory 155, the timer 160, the battery 165, and the communication element 170. The memory 155 may comprise, e.g., a flash memory device. The timer 160 may comprise a mechanical timing device. Alternatively, the timer 160 may comprise a software program executed by the processor 150. The user terminal 100 may also include a battery 165 to provide power to the processor 150. In this embodiment the communication element 170 is capable of Bluetooth and/or WLAN communication.

When communicating with the base station 105, the user terminal 100 needs to utilize various link parameters or other system parameters. Instead of determining the appropriate parameters for the user terminal 100 by a process including probing the channel conditions, reporting the results to the base station 105, and performing a signaling/negotiation of the values between the base station 105 and the user terminal 100, the user terminal 100 acquires many, or all, of these parameters by communicating with other nearby user terminals via, e.g., Bluetooth or WLAN, that have previously performed similar tests to determine these parameters or have acquired them from another user terminal. The user terminal 100 collects information from neighboring user terminals that assist it in adapting its link parameters (or other system parameters) and more generally learn more about the system. The detection element 167 detects a second user terminal of the wireless system having wireless system information, and the collection element 169 collects timely wireless system parameters from the second user terminal. The collection element 169 further may be configured and arranged to collect the timely wireless system parameters before the user terminal communicates with base station 105. While detection element 167 and collection element 169 are depicted in FIG. 2 as external to processor 150, in various embodiments of the present invention one or more of the detection element and the collection element may be implemented in processor 150.

Accordingly, the user terminal 100 obtains as much cellular system information from neighboring user terminals 100 as possible so that the amount of signaling overhead in the cellular system is reduced. Additionally, the power consumption of the user terminals 100 is reduced, leading to a longer life for the battery 165 of the user terminal 100. There are cases, however, in which individual battery resources may be acceptably used for an overall system benefit. In many cases, reducing signaling, or generally reducing use of over-the-air cellular resources, will reduce delay and latency for the user terminal 100.

Figure 3:
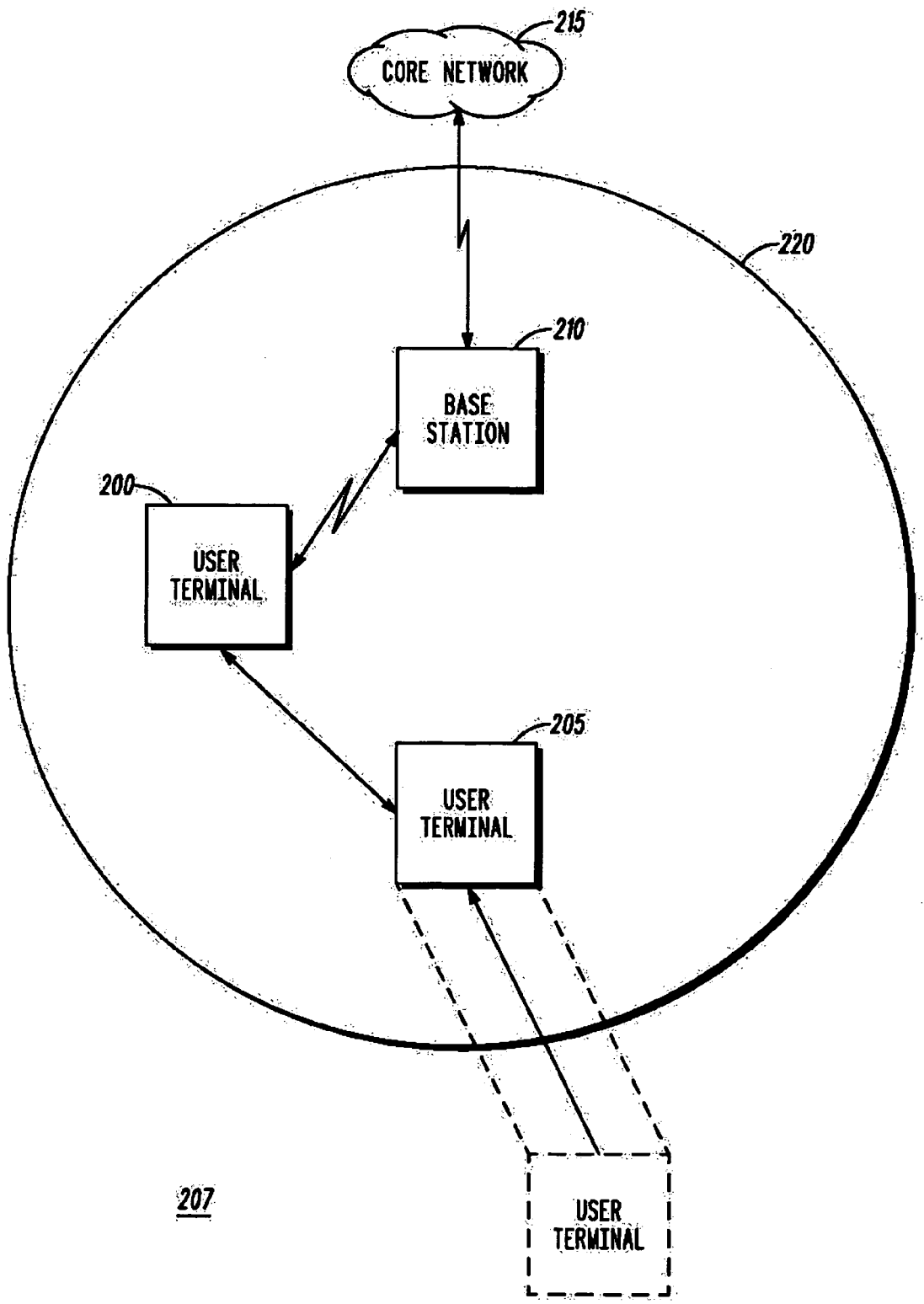
FIG. 3 illustrates a user terminal exchanging cellular system information with a second user terminal in a cellular system according to an embodiment of the invention.

FIG. 3 illustrates a user terminal 200 exchanging cellular system information with a second user terminal 205 in a cellular system 207 according to an embodiment of the invention. As shown, user terminal 200 is in communication with a base station 210. The user terminal 200 may be similar to, or the same as, the user terminal 100 shown in FIG. 2. The base station 210 is in communication with a core network 215. Accordingly, when a call in made with user terminal 200, data is transmitted from user terminal 200 to the base station 210, which then transmits the data to the core network 215. The base station 210 provides cellular service within cell 220. Outside of the range of cell 220, user terminal 200 would have to be handed off to a different base station capable of providing better or more reliable service to user terminal 200.

As illustrated, user terminal 205 is initially located outside of the cell 220. Prior to entering the cell 220, the user terminal 205 has minimal knowledge, if any, about the base station 210, including various communication protocols required for communicating with the base station 210. These protocols may be location-dependent parameters such as modulation level and coding rate, transmit power, timing advance for uplink transmissions, and/or the identities of neighboring base stations.

Accordingly, when a user terminal 205 enters into the cell 220, the user terminal 205 has to acquire these parameters. As discussed above, the user terminal 205 may acquire these parameters from other user terminals, such as the user terminal denoted by reference numeral 200, already within the cell 220.

This exchange of cellular system information between user terminals 200 and 205 reduces use of cellular resources so that, e.g., the base station's 210 bandwidth is not excessively used by user terminal 205 to determine system parameters. User terminal 200 may also provide user terminal 205 with handoff parameters (e.g., a list of neighboring base stations), random access produced parameters to avoid Random Access Channel ("RACH") collisions, and position information. A downlink data relay from multiple nearby user terminals combined at the target and shared position information may be used to help determine the various parameters, resulting in faster reception and fewer communications errors. User terminal 200 may also share broadcast data to reduce over the air subscription requests and grants. For example, if user terminal 200 is a subscriber to an on-air radio program, user terminal 200 may transmit, e.g., data for the on-air program to user terminal 205 after it is received at user terminal 200.

User terminal 200 may also share system information that may be sent on an irregular basis, such as only once per superframe (e.g., Time Division Duplexing ("TDD") split, cyclic prefix length, etc.). User terminal 200 may provide user terminal 205 with current system performance parameters such as average loading, average latency, and average received carrier-to-co-channel interference ("C/I") ratio. This information can help a multi-mode and/or multi-band user terminal to select an appropriate network that meets its user requirements.

Referring to FIG. 3, user terminal 200 may be a currently or recently activated user terminal. User terminal 200, along with most other user terminals, may have a built-in WLAN or Bluetooth capability so that it can be used to access WLAN hotspots. The cellular system 207 may utilize TDD and Orthogonal Frequency Division Multiplexing ("OFDM") transmission. As a result, accurate uplink timing advance is critical for proper operation of the system (e.g., to prevent intracell interference), and the initial advance procedure can involve significant overhead. User terminal 200 may be located, e.g., 1.5 km from base station 210 and may have adapted its parameters for proper communication with the base station 210, including a timing advance setting of, e.g., 5 µs.

Figure 4:
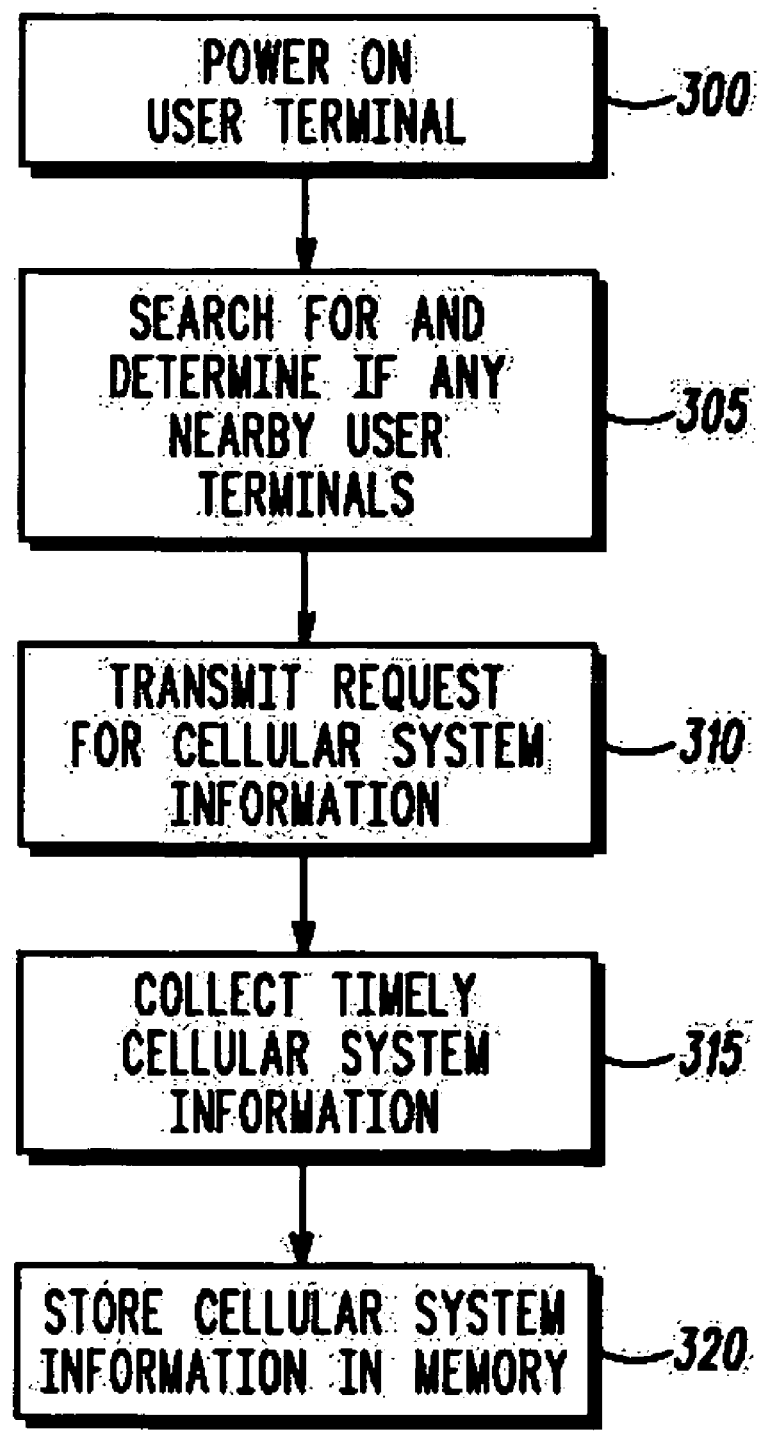
FIG. 4 illustrates a method of user terminal acquiring cellular system information including cellular system parameters from user terminal according to an embodiment of the invention.

FIG. 4 illustrates a method of user terminal 205 acquiring cellular system information including cellular system parameters from user terminal 200 according to an embodiment of the invention. First, at step 300, user terminal 205 is powered on when in the vicinity of user terminal 200. Alternatively, user terminal 205 may awaken from a sleep mode. User terminal 205 is capable of accessing the cellular system 207 in order to adapt its parameters. However, before communicating with the base station 220, user terminal 205 searches for and determines, at step 305, whether there are any nearby user terminals within a predetermined communications range that have current cellular system information about the cellular system 207 and/or appropriate user terminal parameter values. This may be done, e.g., at step 310 by sending a request on the WLAN channel at low power such that only nearby user terminals would receive the request. This low power level may be a different (and lower) power level than might be used for WLAN communication with a WLAN access point ("AP"). Alternatively, the communication method may be via Bluetooth or other types of direct user terminal-to-user terminal communication.

Alternatively, user terminal 200 and additional user terminals (not shown) may be configured such that any user terminal with timely information automatically transmits a low power beacon signal on the WLAN channel to announce that it has cellular system information to share with other user terminals. The parameter values may also be included in the beacon signal since the minimum packet size in WLAN systems can convey a significant amount of information.

After user terminal 205 determines that user terminal 200 is nearby and has timely cellular system information, it may then collect, at step 315, the cellular system information, including many of the initial system parameters and/or a neighbor list from user terminal 200. For example, user terminal 205 may collect the cell ID and channel number. This information may help user terminal 205 to speed up its initial cell search procedure. This also provides a way to validate whether the information from user terminal 200 is actually usable by user terminal 205. After user terminal 205 has determined which cell to join and the corresponding cell ID, it may check to determine whether the information from user terminal 200 is actually from the same cell 220. After the cellular system information has been collected, the cellular system information stored in user terminal's 205 memory is updated or initialized with the cellular system information at step 320. In the event that a neighbor list is exchanged between user terminals 200 and 205, user terminal 205 performs measurements, etc., with at least one base station in the communicated neighbor list.

The sharing of cellular system information between user terminals 200 and 205 is very beneficial. Because a neighbor list or the need to handoff is location-dependent, the neighbor list information from a proximal user terminal 200 is useable by user terminal 205.

The user termninal-to-user terminal communication link being used would additionally guide the use of such proximal information. If the normal communications range of the technology to be used for the user terminal-to-user terminal communication is too large such that the search for a proximal user terminal would yield a user terminal that is not proximal (e.g., more than 100 meters away), the search can be performed by using the technology with reduced power to reduce the communication range. For example, given Bluetooth's shorter range as compared to WiFi, one could depend on such proximal information much more when obtained through a Bluetooth link than when obtained through WiFi. Hence, GPS-supported location information may also be helpful.

Although only user terminals 200 and 205 are shown in FIG. 3, additional user terminals may also be utilized. Cellular system information from recent measurement report information from multiple user terminals may be utilized to tune or confirm measurements. The measurement reports are essentially used to filter the neighbor list of base stations on which to make measurements for a user terminal moving into a new cell or being powered on or awoken from a sleep mode.

Another parameter that user terminal 205 may collect for user terminal 200 is a timing advance value. The initial timing advance value for user terminal 205 may be based on the corresponding value used by user terminal 200. This can improve the performance of the random access channel of the system and reduce the number of bits needed to perform any further adjustment of the timing advance.

Additional parameters may be exchanged, including those to help determine initial power control, Modulation and Coding Scheme ("MCS"), path loss, transmission power ("Tx power"), downlink channel-to-interference ("C/(I+N)") ratios, the modulation and coding scheme being used on the downlink, and the modulation and coding scheme being used on the uplink. Other parameters exchanged include those to determine the initial multiple-antenna technology to utilize. Some parameters are also exchanged to assist user terminal 205 in determining the type of performance to be expected, such as the average cell loading, average latency, average bit rate experienced, and so forth.

Depending on the type of relaying used, pre-information may be exchanged to perform fast/efficient relaying. For example, the closest relay, the routing path, etc. may be exchanged. For a hierarchical routing concept, it can be a way to join the system in an ad-hoc mode without any need to wait for the next routing tree update. This reduces latency because the user terminal 205 may join the system and immediately achieve a high bit rate.

Furthermore, user terminal 200 may advertise that it may be used as an uplink relay for a particular traffic class and for a particular time duration. User terminal 200 may have higher transmit power capabilities than a portable user terminal. The cellular system 207 may provide incentives to user terminal 200 such as cost credits, airtime credits, etc., and/or may penalize user terminal 205 by, e.g., deducting double the airtime minutes.

Some of the parameters discussed above, such as C/(N+I) and cell ID may be obtained by passively monitoring the downlink of the cellular system 207, in which case no additional use of the cellular system resources would be used. However, it may be more efficient in both terms of time and power consumption to obtain this information from a neighboring user terminal 200.

User terminal 200 and user terminal 205 may each include a timer (such as that shown above in FIG. 2) or other means for determining whether their parameter values are still valid (i.e., timely) and use this to determine whether to transmit the information to a neighboring user terminal. Moreover, after user terminal 205 receives the cellular system information from user terminal 200, user terminal 205 is capable of determining whether the received cellular system information is accurate or not. A way of doing this is to monitor multiple user terminals. Another way is to get this information directly by performing some system measurements (e.g., such as downlink C/(N+I)) and by comparing it to what the neighboring user terminal is reporting. Additionally, the user terminal transmissions may also include relative time information (i.e., relative to current transmission time) when the user terminal specific parameter values were updated, such as which parameters were adapted a certain number of frames before the current transmission. A user terminal 200 monitoring multiple neighbor user terminal transmissions can then select the parameters that it considers to be the most recent from among the multiple neighbor user terminal transmissions.

Figure 5:
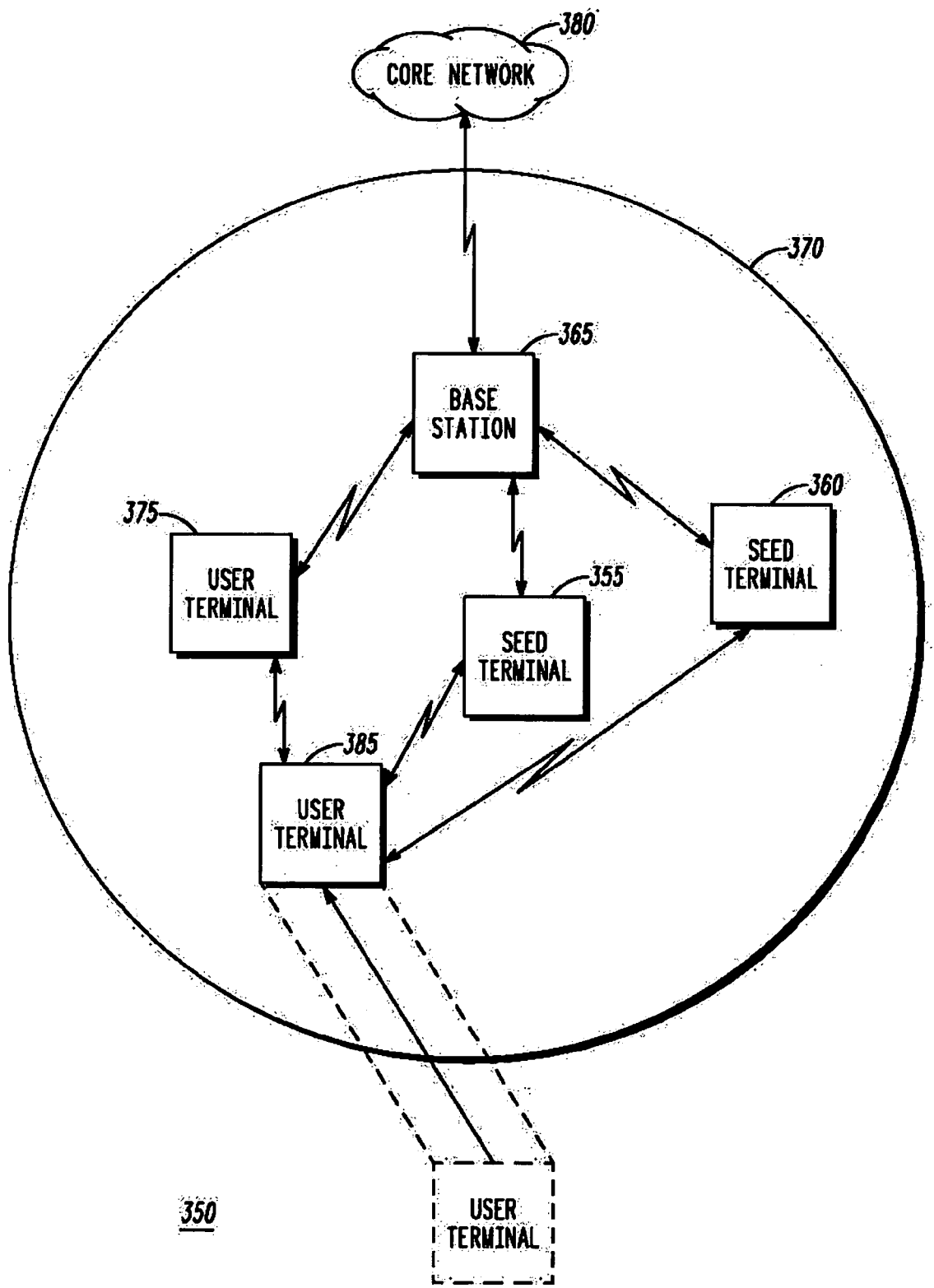
FIG. 5 illustrates a cellular system utilizing seed terminals according to an embodiment of the invention.

The cellular system 207 may also utilize "seed" user terminals. For example, a system operator may deploy one or mixed fixed user terminals around the cell 220 to support the method described above with respect to FIG. 4. FIG. 5 illustrates a cellular system 350 utilizing seed terminals 355 and 360 according to an embodiment of the invention. Seed terminals 355 and 360 may be in communication with a base station 365 within cell 370. User terminal 375 may also be in communication with base station 365. The base station 365 is also in communication with a core network 380. When a user terminal 385 is near seed terminals 355 and 360, or user terminal 375, and is powered on or awakens from a sleep mode, it may attempt to acquire cellular system information from user terminal 375 and seed terminals 355 and 360, and may use the best cellular system information from these devices according to the method described above with respect to FIG. 4. In addition to acquiring information when a user terminal is powering on or awakening from sleep mode, seed terminals 355 and 360 may be used for exchange of other parameters, which may occur for example periodically or upon entering a new cell.

The use of seed terminals 355 and 360 is beneficial in a number of ways. First, the seed terminals 355 and 360 can be plugged into a power source, so battery life is not a concern for them. Second, because the seed terminals 355 and 360 are stationary, their parameters will remain timely for a long period of time. Third, the seed terminals 355 and 360 will always be present within the cell 370, whereas mobile user terminals (e.g., user terminal 375) can come and go. This increases the likelihood that the new user terminal 385 will be able to obtain useful system information without communicating with the base station. Fourth, seed terminals 355 and 360 may be configured to perform only the minimal necessary interactions with the cellular system 350, just to keep their parameters current. In addition to supporting the neighbor-assisted user terminal adaptation, seed terminals 355 and 360 may also be used to perform relaying for the cellular system 350.

Proximal mobiles can be fixed units providing localized broadcasts with information on neighbor cells, initial search parameters, network availability information, etc. In particular, background scanning for (home, higher priority) networks is a rather battery-consuming operation. Having information about likely success in background scanning would be helpful.

Alternatively, mobile seed terminals may be utilized. For example, mobile seed terminals may be placed on city buses or trains within a cellular service area. These types of mobile seed terminals would provide to the user terminals on the buses or trains all of the benefits described above with respect to the stationary user terminal.

The cellular system may also utilize a centralized architecture. For example, in the event that the cellular system is, e.g., a 4G system and the user terminals have a WLAN capability, the user terminals may report their measurements to a central node. The central node may comprise, e.g., a desktop computer that compiles the measurement reports and broadcasts them on the WLAN. To ensure that the information is not out-of-date, all of the participating user terminals need to periodically report their measurements. This centralized control may also enable a filtering of the information. For example, if a user terminal reports information that is very different from the other participating user terminals, such information is probably erroneous (or of little value for most of the other user terminals). This can be seen as a generalization of a ping-pong aspect discussed below.

To implement a ping-pong aspect, a pair of user terminals can help each other over time. Referring to FIG. 3, user terminal 205 may initially adapt its parameters based on the information from user terminal 200. If user terminal 205 subsequently remains active and user terminal 200 becomes inactive, if user terminal 200 is to activate again it may not have accurate parameters. For example, it may not be able to determine whether it was moving during its inactive state. Accordingly, as user terminal 200 transitions to the active mode, it may obtain the current parameters back from user terminal 205.

The exchange of the parameters may also be utilized to perform a network or system selection. For example, it may be that multiple systems are available at a give location, e.g., WLAN(s), different cellular systems (new phones capable of multimode operations: e.g., Integrated Digital Enhanced Network ("IDEN")/Global System for Mobile Communications ("GSM"), Code Division Multiple Access ("CDMA")/GSM) or different carriers. Instead of having to scan multiple bands with different technology, a user terminal could instead get this information from neighboring user terminals.

The exchange of the parameters may also be utilized for performing a random access channel ("RACH") "cooperative game" to avoid collisions. For example, the terminals may avoid or agree to timeshare certain RACH resources, such as RACH codes or timeslots. Alternatively, the parameters could be utilized to perform Not Real-Time ("NRT") traffic distribution, i.e., two user terminals may coordinate with each other to ensure that they do not request large bandwidths at the same time. Moreover, in the event that two user terminals request the same item (e.g., first broadcasting of a particular song on the Internet), one could receive it from the base station and relay it to the second user terminal. This may feed into a virtual drive-in theatre concept/4G unit as a WLAN access point.

In an alternative embodiment where the cellular system utilizes TDD, it is possible for user terminal 205 to obtain a limited amount of information from user terminal 200 without any direct interact between user terminal 205 and user terminal 200. For example, user terminal 205 may leave its receiver on for both the downlink and the uplink portion of the TDD frame or it can leave its receiver on continuously if it does not have any information about the frame timing. When user terminal 200 is transmitting on the uplink to the base station 210, user terminal 205 will also receive the signal, and it will be received with high power because user terminal 205 is in close proximity to user terminal 200. User terminal 205 may then infer some information from the uplink transmission of user terminal 200. For example, timing advance can be determined from the start time of user terminal's 200 transmission.

In another alternative embodiment, semi-active monitoring is implemented. For example, user terminal 200 only transmits its user ID over the WLAN system. User terminal 205 subsequently acquires the appropriate parameters by monitoring the control messages between the base station 210 and user terminal 200. An alternative way to learn the user ID without the WLAN capability is for user terminal 200 to include its user ID is its uplink transmissions so user terminal 205 can decode the user ID by monitoring user terminal's 200 uplink transmissions.

According to an additional embodiment, in-band monitoring is performed. User terminal 200, which is synchronized to the base station 210, can transmit the location-dependent parameters in-band at a low transmit power level instead of using a WLAN channel. The location of the in-band transmissions may be (a) unused portions of the downlink frame such as sub-carriers that are not used like the DC sub-carrier; (b) transmissions on at least a portion of the RACH channel; or (c) in the case where the cellular system uses TDD, transmit during he turn-around time from downlink to uplink.

Pursuant to these teachings information regarding cellular system and/or user operating conditions, parameters, and lists of neighboring base stations for handing over calls is obtained directly from nearby user terminals in an accurate and timely manner. These benefits accrue notwithstanding a general lessening of overall overhead burdens on cellular system resources.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method, comprising:
   detecting, by a first user terminal of a wireless system, a second user terminal having wireless system information, the wireless system information comprising timely wireless system parameters;
   collecting the timely wireless system parameters from the second user terminal; and
   communicating, by the first user terminal, with a base station based on the timely wireless system parameters.

2. The method of claim 1, further comprising exchanging information between the first user terminal and the second user terminal to validate that the first user terminal and the second user terminal both utilize the wireless system.

3. The method of claim 1, further comprising locally transmitting, by the first user terminal, an information request for the timely wireless system parameters.

4. The method of claim 3, wherein in response to the timely wireless system parameters being received from a third user terminal beyond a threshold distance from the first user terminal, the locally transmitting of the information request is repeated with reduced power to reduce a corresponding communication range.

5. The method of claim 3, wherein a transmit power amount for the locally transmitting is set such that the second user terminal is within a threshold distance of the first user terminal, the threshold distance being determined by a calculation of a distance between the first user terminal and the second user terminals.

6. The method of claim 1, further comprising periodically broadcasting, by the second user terminal, the timely wireless system parameters.

7. The method of claim 1, the timely wireless system parameters comprising one or more of:
   timing advance parameters for uplink transmissions;
   an ID and channel number corresponding to the second user terminal;
   handoff parameters;
   random access procedure parameters to avoid random access channel ("RACH") collisions;
   location information;
   downlink data relay from a plurality of user terminals;
   broadcast data to reduce over-the-air subscription requests and grants;
   information transmitted on an irregular basis; and
   current system performance parameters.

8. The method of claim 7 wherein the handoff parameters comprise a subset of neighboring base stations of the second user terminal.

9. The method of claim 7, wherein the current system performance parameters comprise one or more of:
   radio channel quality;
   average loading;
   average latency; and
   average received carrier-to-interference ratio.

10. The method of claim 1, wherein the timely wireless system parameters are transmitted from the second user terminal to the first user terminal via a technology selected from the group consisting of: a wireless Local Area Network (LAN) and Bluetooth.

11. The method of claim 1, wherein the detecting is performed in response to the first user terminal performing a function comprising at least one of powering on and waking up.

12. A user terminal, comprising:
    a detection element to detect a second user terminal of a wireless system having wireless system information, the wireless system information comprising timely wireless system parameters;
    a collection element to collect the timely wireless system parameters from the second user terminal; and
    a communication element to communicate with a base station based on the timely wireless system parameters.

13. The user terminal of claim 12, further comprising a transmitter element to transmit an information request for the timely wireless system parameters.

14. The user terminal of claim 12, wherein the collection element is further configured and arranged to collect the timely wireless system parameters before the communication element communicates with the base station.

15. The user terminal of claim 12, wherein the timely wireless system parameters comprise handoff parameters comprising a subset of neighboring base stations of the second user terminal.

16. A system, comprising:
    a first user terminal of a wireless system, wherein the first user terminal has corresponding wireless system information, the wireless system information comprising timely wireless system parameters; and
    a second user terminal of the wireless system, the second user terminal being configured and arranged to detect the first user terminal of the wireless system, to collect the timely wireless system parameters from the first user terminal, and to communicate with a base station based on the timely wireless system parameters.

17. The system of claim 16, wherein the second user terminal is further configured and arranged to locally transmit an information request for the timely wireless system parameters.

18. The system of claim 17, wherein the first user terminal is further configured and arranged to periodically broadcast the timely wireless system parameters.

19. The system of claim 18, wherein the second user terminal is further configured and arranged to collect the timely cellular system parameters before communicating with the base station.

20. The system of claim 18, wherein the timely wireless system parameters comprise handoff parameters comprising a subset of neighboring base stations of the second user terminal.

* * * * *